US012251353B1

(12) United States Patent
Liu

(10) Patent No.: US 12,251,353 B1
(45) Date of Patent: Mar. 18, 2025

(54) ROTARY MASSAGE DEVICE

(71) Applicant: Zhengping Liu, Jiangxi (CN)

(72) Inventor: Zhengping Liu, Jiangxi (CN)

( * ) Notice: Subject to any disclaimer, the term of this patent is extended or adjusted under 35 U.S.C. 154(b) by 0 days.

(21) Appl. No.: 18/923,880

(22) Filed: Oct. 23, 2024

(51) Int. Cl.
*A61H 19/00* (2006.01)
*A61H 23/02* (2006.01)

(52) U.S. Cl.
CPC ......... *A61H 19/44* (2013.01); *A61H 23/0254* (2013.01); *A61H 2201/169* (2013.01)

(58) Field of Classification Search
CPC .......... A61H 9/44; A61H 21/00; A61H 19/00; A61H 19/40; A61H 23/00; A61H 23/0254; A61H 19/50; A61H 7/005; A61H 15/0085
See application file for complete search history.

(56) References Cited

U.S. PATENT DOCUMENTS

| | | | | |
|---|---|---|---|---|
| 11,369,545 | B1 * | 6/2022 | He | A61H 19/34 |
| 11,890,251 | B1 * | 2/2024 | Zhou | A61H 19/44 |
| 11,980,582 | B1 * | 5/2024 | Wang | A61H 23/0254 |
| 2020/0178943 | A1 * | 6/2020 | Nakamura | A61F 5/451 |

* cited by examiner

*Primary Examiner* — Margaret M Luarca
*Assistant Examiner* — Sarah B Lederer
(74) *Attorney, Agent, or Firm* — Daniel M. Cohn; Howard M. Cohn

(57) ABSTRACT

A driving mechanism includes a driving piece, a rotating shaft and a first conductive piece. The driving piece is connected to the rotating shaft to drive the rotating shaft to rotate. The first conductive piece is sleeved on the rotating shaft. The rotating mechanism includes a first housing, an electric component, and a second conductive piece. The first housing is connected to the rotating shaft. The electric component is mounted on the first housing. The electric component is electrically connected to the second conductive piece. The second conductive piece is sleeved on the rotating shaft. The second conductive piece abuts against and is electrically connected to the first conductive piece.

20 Claims, 5 Drawing Sheets

ROTARY MASSAGE DEVICE

TECHNICAL FIELD

The present disclosure relates to a field of health care technology, and in particular to a rotary massage device.

BACKGROUND

A rotary massage device is a sex toy, which mainly comprises a driving mechanism and a rotating mechanism. The driving mechanism is configured to drive the rotating mechanism to rotate. However, in the related art, the rotating mechanism has a single function and is unable to meet needs of users.

SUMMARY

Embodiments of the present disclosure provide a rotary massage device that increases a function of a rotating mechanism thereof by an electric component in the rotating mechanism to meet needs of users.

Embodiments of the present disclosure provide the rotary massage device. The rotary massage device comprises a driving mechanism and a rotating mechanism.

The driving mechanism comprises a driving piece, a rotating shaft and a first conductive piece. The driving piece is connected to the rotating shaft to drive the rotating shaft to rotate. The first conductive piece is sleeved on the rotating shaft.

The rotating mechanism comprises a first housing, an electric component, and a second conductive piece. The first housing is connected to the rotating shaft. The electric component is mounted on the first housing. The electric component is electrically connected to the second conductive piece. The second conductive piece is sleeved on the rotating shaft. The second conductive piece abuts against and is electrically connected to the first conductive piece.

Optionally, the second conductive piece comprises a conductive circuit board and conductive pins. The conductive circuit board is sleeved on the rotating shaft. The conductive pins are connected to one side of the conductive circuit board facing the first conductive piece. Each of the conductive pins is elastically abutted against and electrically connected to the first conductive piece. The conductive circuit board is electrically connected to the electric component.

Optionally, the rotating mechanism further comprises a conductive fixing piece. The conductive fixing piece is fixedly connected to the first housing. The conductive circuit board is mounted on the conductive fixing piece. The conductive fixing piece is connected to the rotating shaft and rotates along with the rotating shaft.

Optionally, the first conductive piece defines conductive regions. Each of the conductive regions is disposed around the rotating shaft, and the conductive regions are insulated from each other.

Distance between the conductive pins and an axis of the rotating shaft are different. Each of the conductive pins are electrically connected to a corresponding one of the conductive regions.

Optionally, the conductive fixing piece comprises a mounting hole. The rotating shaft comprises an end portion plugged into the mounting hole. The end portion has a cutting surface, and a shape of the mounting hole is matched with the end portion of the rotating shaft, so that the conductive fixing piece rotates along with the end portion of the rotating shaft.

Optionally, the electric component comprises a vibrator. The vibrator is electrically connected to the second conductive piece. The vibrator is connected to the first housing. The vibrator is configured to vibrate and drive the first housing to vibrate.

Optionally, the first housing comprises a first portion close to the driving mechanism and a second portion away from the driving mechanism. The vibrator is disposed on the second portion.

Optionally, the electric component comprises a heater. The heater is electrically connected to the second conductive piece. The heater is connected to the first housing. The heater is configured to generate heat and conduct the heat to the first housing.

Optionally, the first conductive piece comprises a conductive sheet. The conductive sheet is sleeved on the rotating shaft and is fixedly connected to the driving piece. The conductive sheet abuts against the second conductive piece and is electrically connected to the second conductive piece.

Optionally, the first conductive piece further comprises a conductive fixing base. The conductive fixing base is sleeved on the rotating shaft and is fixedly connected to the driving piece. The conductive sheet is fixedly connected to one side of the conductive fixing base away from the driving piece.

Optionally, the conductive sheet defines conductive regions. Each of the conductive regions is annular, each of the conductive regions is disposed around the rotating shaft, and the conductive regions are insulated from each other.

The second conductive piece comprises conductive pins. Distance between the conductive pins and an axis of the rotating shaft are different. Each of the conductive pins is electrically connected to a corresponding one of the conductive regions.

Optionally, the first housing comprises a first hard shell and a first soft shell. The first hard shell is disposed in the first soft shell. The electric component and the second conductive piece are mounted in the first hard shell.

Optionally, a concave-convex structure or a convex spiral structure is disposed on an outer surface of the first soft shell.

Optionally, the driving mechanism comprises a second housing. The driving piece is disposed in the second housing. A gap is defined between the second housing and the first housing.

Optionally, the second housing comprises a second hard shell and a second soft shell. The second hard shell is at least partially disposed in the second soft shell. The driving piece is disposed in the second hard shell.

Optionally, the driving mechanism further comprises a battery and a control circuit board. The battery and the control circuit board are disposed in the second housing. The battery is disposed on one side of the driving piece away from the rotating mechanism. The battery is electrically connected to the control circuit board, and the control circuit board is electrically connected to the first conductive piece.

Optionally, the control circuit board and the battery are disposed along a width direction of the rotary massage device. The control circuit board is at least partially disposed opposite to the battery.

Optionally, the control circuit board is partially disposed opposite to the driving piece.

Optionally, the driving mechanism further comprises at least one control button. The at least one control button is at least partially exposed outside the second housing. The at least one control button is electrically connected to the control circuit board.

Optionally, the driving mechanism further comprises a charging interface. The charging interface is at least partially exposed outside the second housing. The charging interface is electrically connected to the control circuit board. The charging interface and the at least one control button are disposed on two opposite sides of the second housing.

In the present disclosure, the rotary massage device comprises the driving mechanism and the rotating mechanism. The driving piece of the driving mechanism is capable of driving the rotating shaft to rotate. The rotating shaft is connected to the first housing of the rotating mechanism, thereby driving the first housing to rotate. The first conductive piece of the driving mechanism and the second conductive piece of the rotating mechanism are both sleeved on the rotating shaft, and the first conductive piece and the second conductive piece abut against each other, so that the first conductive piece and the second conductive piece do not affect a rotation of the first housing driven by the rotating shaft while realizing an electrical connection therebetween. The second conductive piece is electrically connected to the electric component mounted on the first housing, so that power is supplied to the electric component. The electric component enables the rotating mechanism to have additional functions, such as vibration or heating, to meet the needs of users.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

REFERENCE NUMBERS IN THE DRAWINGS

Figure 1:
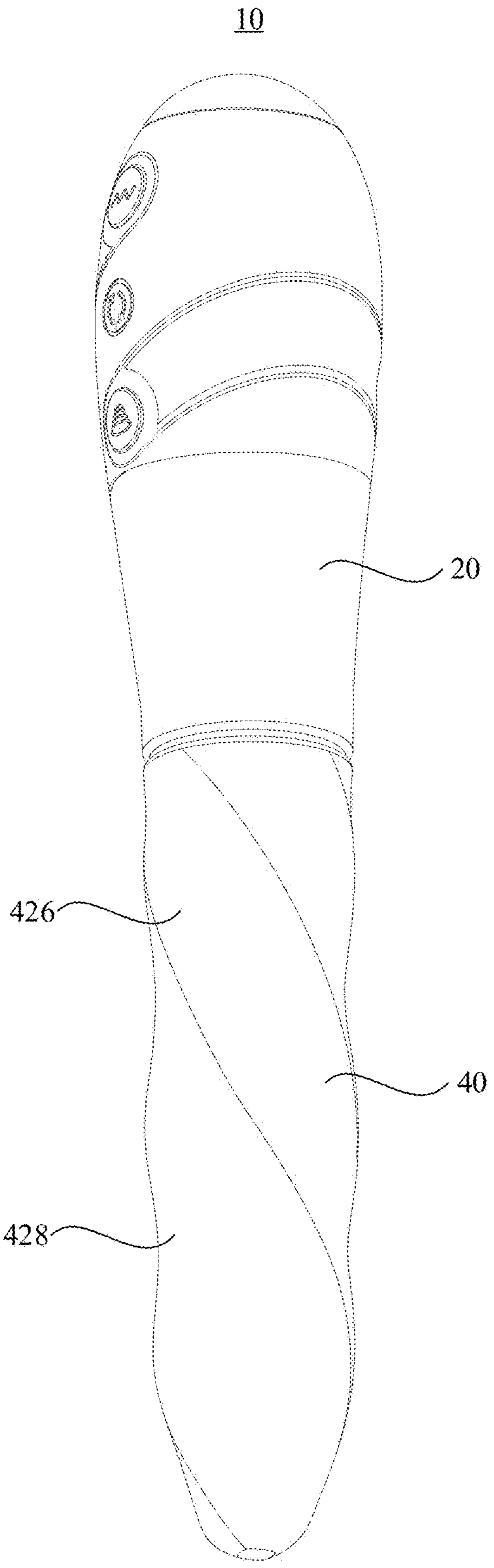
FIG. 1 is a schematic diagram of a rotary massage device according to one embodiment of the present disclosure.

10—rotary massage device, 20—driving mechanism, 21—second housing, 212—second hard shell, 2122—second sub-shell, 2124—rear cover, 2126—sheet cover, 214—second soft shell, 22—driving piece, 23—rotating shaft, 232—cutting surface, 24—first conductive piece, 242—conductive sheet, 2422—conductive region, 244—conductive fixing base, 25—battery, 26—control circuit board, 27—control button, 28—charging interface, 40—rotating mechanism, 42—first housing, 422—first hard shell, 424—first soft shell, 426—first portion, 428—second portion, 44—electric component, 46—second conductive piece, 462—conductive circuit board, 464—conductive pin, 48—conductive fixing piece.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. In addition, it should be understood that the specific embodiments described herein are only used to illustrate and explain the present disclosure, and are not used to limit the present disclosure. In the present disclosure, unless otherwise stated, directional words, such as "upper" and "lower", generally refer to upper and lower parts of a device in actual use or working state, which are specifically refer to the drawing direction in the accompanying drawings. Directional words such as "in" and "out" refer to the outline of the device.

Figure 2:
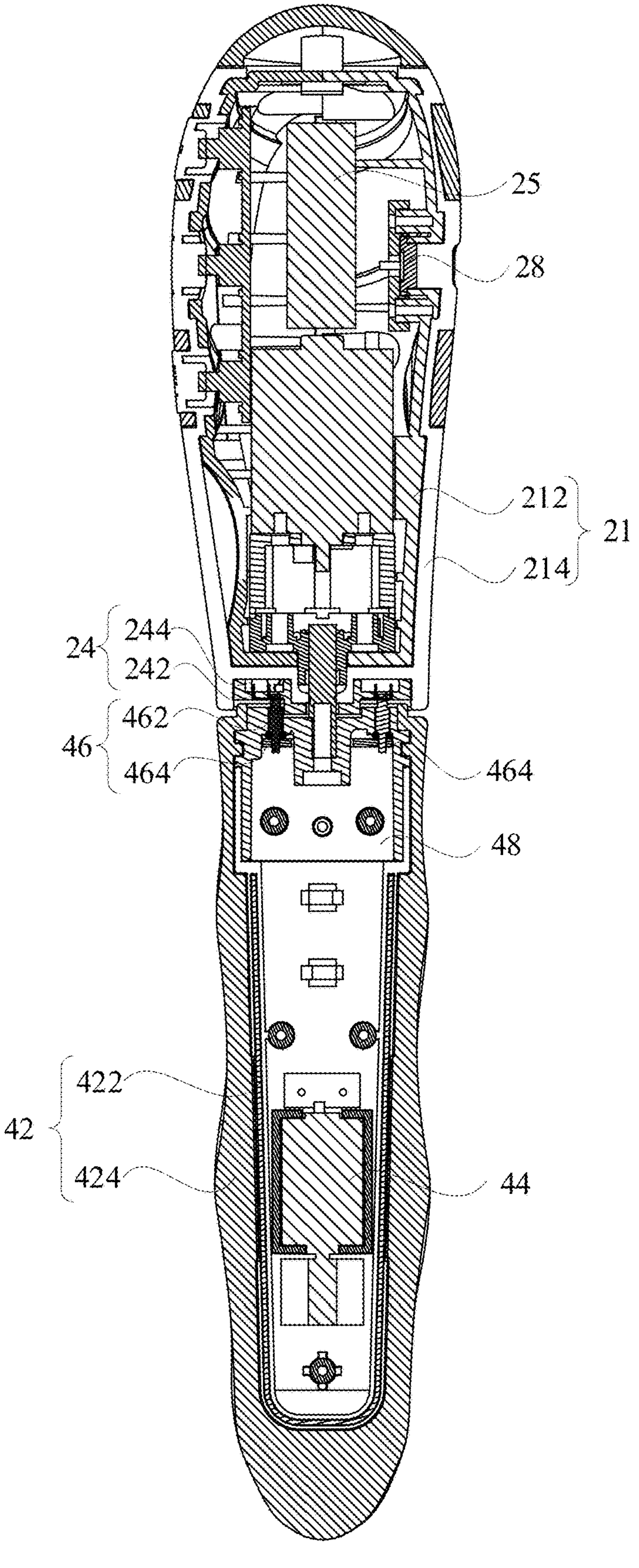
FIG. 2 is a cross-sectional schematic diagram of the rotary massage device shown in FIG. 1.
Figure 3:
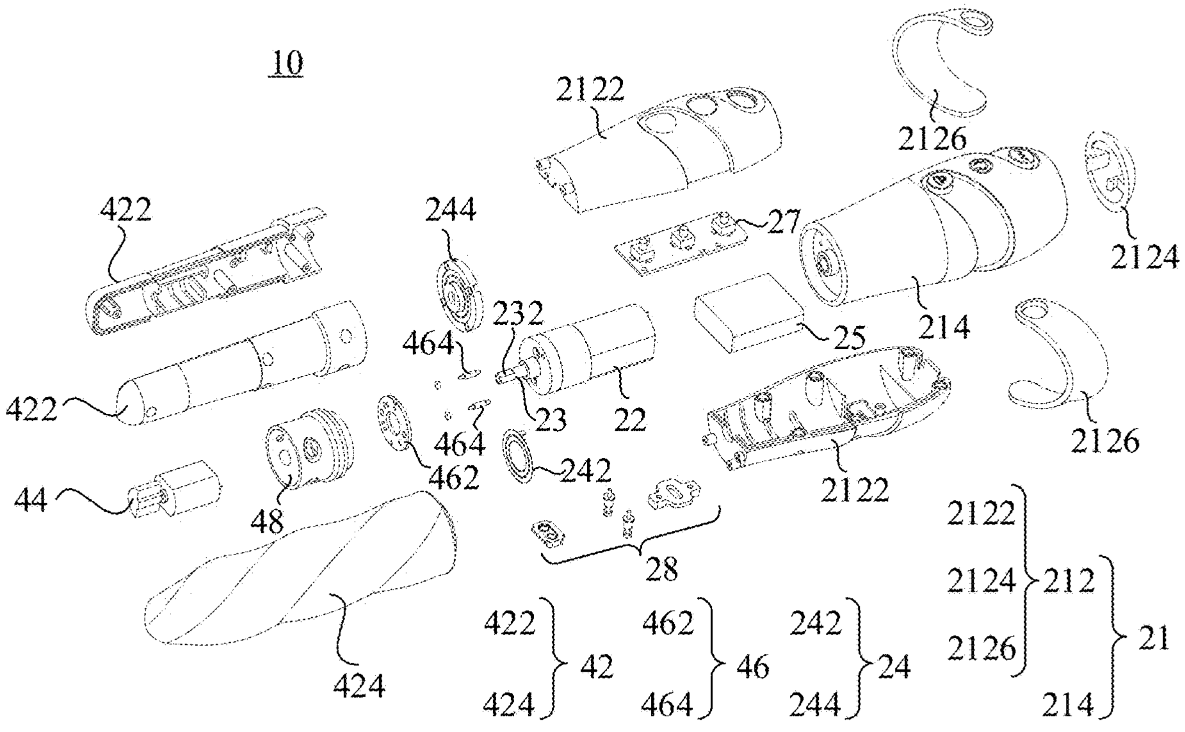
FIG. 3 is an exploded schematic diagram of the rotary massage device shown in FIG. 1.

Embodiments of the present disclosure provide a rotary massage device 10. FIG. 1 is a schematic diagram of the rotary massage device according to one embodiment of the present disclosure. FIG. 2 is a cross-sectional schematic diagram of the rotary massage device shown in FIG. 1. FIG. 3 is an exploded schematic diagram of the rotary massage device shown in FIG. 1. As shown in FIGS. 1-3, the rotary massage device 10 comprises a driving mechanism 20 and a rotating mechanism 40. The driving mechanism 20 comprises a driving piece 22, a rotating shaft 23 and a first conductive piece 24. The driving piece 22 is connected to the rotating shaft 23 to drive the rotating shaft 23 to rotate. The first conductive piece 24 is sleeved on the rotating shaft 23. The rotating mechanism 40 comprises a first housing 42, an electric component 44, and a second conductive piece 46. The first housing 42 is connected to the rotating shaft 23. The electric component 44 is mounted on the first housing 42. The electric component 44 is electrically connected to the second conductive piece 46. The second conductive piece 46 is sleeved on the rotating shaft 23. The second conductive piece 46 abuts against and is electrically connected to the first conductive piece 24.

The driving piece 22 of the driving mechanism 20 is capable of driving the rotating shaft 23 to rotate. The rotating shaft 23 drives the first housing 42 to rotate. The first conductive piece 24 of the driving mechanism 20 and the second conductive piece 46 of the rotating mechanism 40 are both sleeved on the rotating shaft 23, and the first conductive piece 24 and the second conductive piece 46 abut against each other, so that the first conductive piece 24 and the second conductive piece 46 do not affect a rotation of the first housing 42 driven by the rotating shaft 23 while realizing an electrical connection therebetween. The second conductive piece 46 is electrically connected to the electric component 44, so that power is supplied to the electric component 44. The electric component 44 enables the rotating mechanism 40 to have additional functions, such as vibration or heating, to meet the needs of users.

Figure 4:
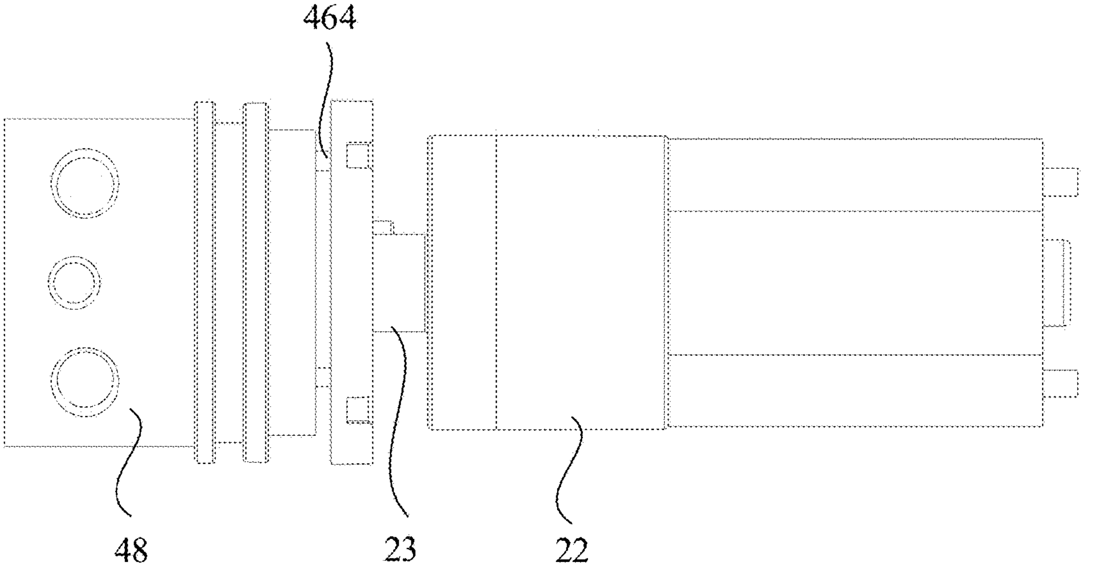
FIG. 4 is a partial schematic diagram of the rotary massage device shown in FIG. 1.
Figure 5:
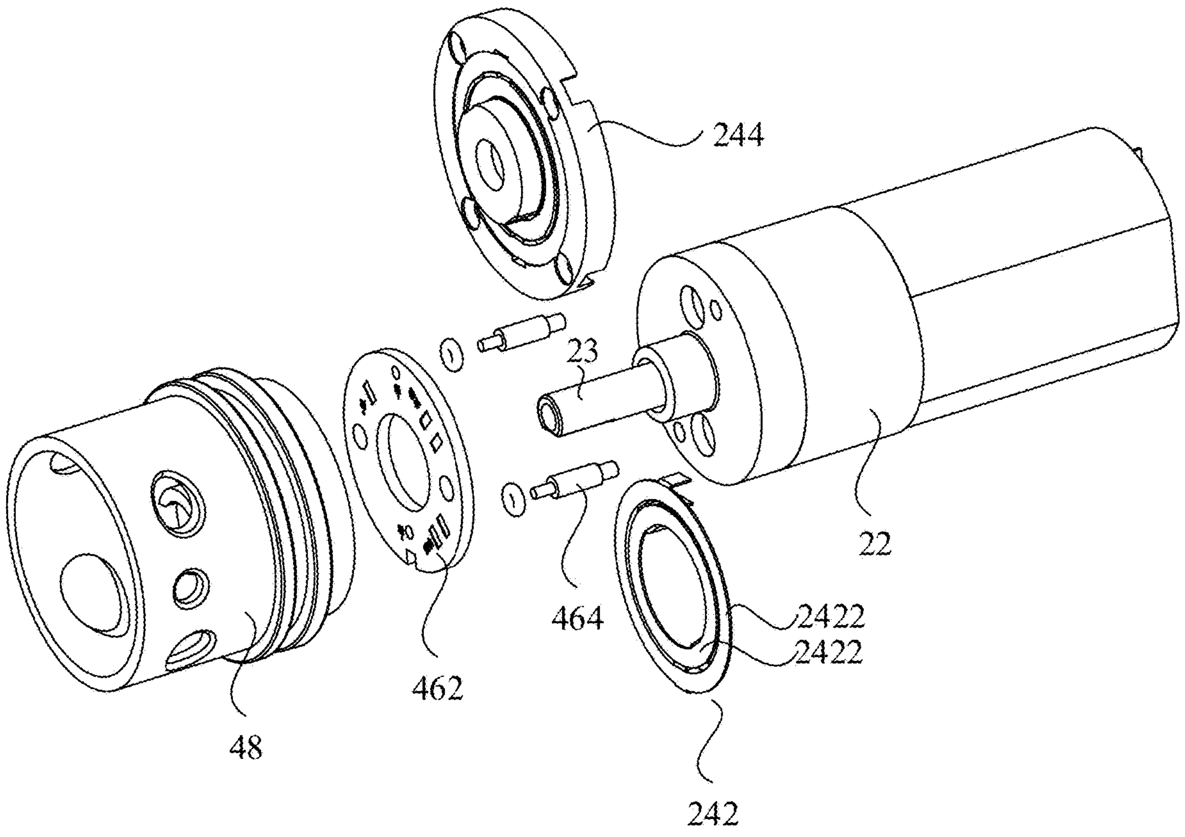
FIG. 5 is an exploded schematic diagram of portions of the rotary massage device shown in FIG. 4.
Figure 6:
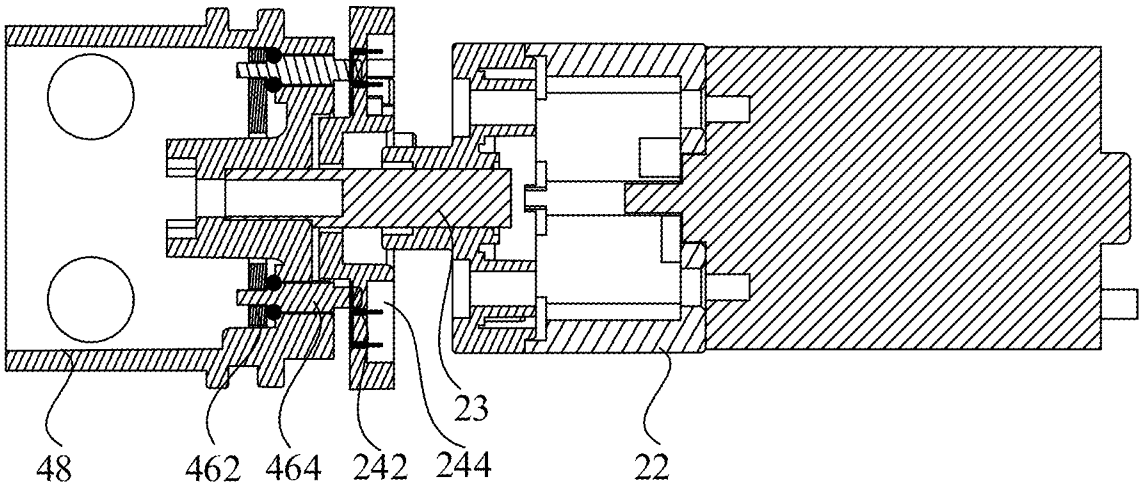
FIG. 6 is a cross-sectional schematic diagram of the portions of the rotary massage device shown in FIG. 4.

FIG. 4 is a partial schematic diagram of the rotary massage device shown in FIG. 1. FIG. 5 is an exploded schematic diagram of portions of the rotary massage device shown in FIG. 4. FIG. 6 is a cross-sectional schematic diagram of the portions of the rotary massage device shown in FIG. 4. As shown in FIGS. 4-6, in some embodiments, the second conductive piece 46 comprises a conductive circuit board 462 and conductive pins 464. The conductive circuit board 462 is sleeved on the rotating shaft 23. The conductive pins 464 are connected to one side of the conductive circuit board 462 facing the first conductive piece 24. Each of the conductive pins 464 is elastically abutted against and electrically connected to the first conductive piece 24. The conductive circuit board 462 is electrically connected to the electric component 44.

The circuit board 462 is electrically connected to the first conductive piece 24 through the conductive pins 464, so the circuit board 462 is powered through the first conductive piece 24. Each of the conductive pins 464 elastically abuts against the first conductive piece 24, so that each of the conductive pins 464 is always electrically connected to the first conductive piece 24 stably even when each of the conductive pins 464 rotates around the rotating shaft 23.

In some embodiments, each of the conductive pins 464 comprises a first conductive portion, a second conductive portion, and a spring connected between the first conductive portion and the second conductive portion, and the first conductive portion thereof and the second conductive portion thereof are sleeved with each other, Each second conductive portion is fixedly connected to the conductive circuit board 462, and each first conductive portion abuts against the first conductive piece 24. Specifically, in an initial stage, the first conductive portion and the second conductive portion of each of the conductive pins 464 compress the spring thereof and cause the spring to be in a compressed state, and an elastic restoring force of the spring of each of the conductive pins 464 stabilizes the first conductive portion of each of the conductive pins 464 against the first conductive piece 24.

It is understood that the conductive pins 464 may also adopt other structures to elastically abut against the first conductive piece 24.

In some embodiments, the rotating mechanism 40 further comprises a conductive fixing piece 48. The conductive fixing piece 48 is fixedly connected to the first housing 42. The conductive circuit board 462 is mounted on the conductive fixing piece 48. The conductive fixing piece 48 is connected to the rotating shaft 23 and rotates along with the rotating shaft 23.

The conductive fixing piece 48 stably mount the conductive circuit board 462 in the first housing 42, and the conductive fixing piece 48 supports and protects the conductive circuit board 462.

In some embodiments, the conductive circuit board 462 is annular. The conductive circuit board 462 is sleeved on the rotating shaft 23. One side of the conductive fixing piece 48 connected to the conductive circuit board 462 is annular and is matched with the conductive circuit board 462.

In some embodiments, the conductive fixing piece 48 is disposed in the first housing 42 and is connected to two side of the first housing 42 along at least one direction, thereby supporting the first housing 42 and increasing a strength of the first housing 42.

In some embodiments, the first conductive piece 24 defines conductive regions 2422. Each of the conductive regions 2422 is disposed around the rotating shaft 23, and the conductive regions 2422 are insulated from each other. Distance between the conductive pins 464 and an axis of the rotating shaft 23 are different. Each of the conductive pins 464 are electrically connected to a corresponding one of the conductive regions 2422. The conductive regions 2422 are similar to a concentric circle structure, so that the conductive regions 2422 are insulated from each other and are capable of maintaining electrical connection with corresponding conductive pins 464.

In some embodiments, the conductive fixing piece 48 comprises a mounting hole. The rotating shaft 23 comprises an end portion plugged into the mounting hole. The end portion has a cutting surface 232, and a shape of the mounting hole is matched with the end portion of the rotating shaft 23, so that the conductive fixing piece 48 rotates along with the end portion of the rotating shaft 23.

The end portion of the rotating shaft 23 has the cutting surface 232, and the mounting hole of the conductive fixing piece 48 is matched with the end portion of the rotating shaft 23. That is, the mounting hole is a non-circular hole, so that the conductive fixing piece 48 is clamped with the end portion of the rotating shaft 23 and the conductive fixing piece 48 is enabled to rotate with the rotating shaft 23.

In some other embodiments, the conductive fixing piece 48 and the rotating shaft 23 may be connected by other structures. For example, the rotating shaft 23 comprises a protrusion, and the conductive fixing piece 48 defines a groove matched with the protrusion. For another example, the rotating shaft 23 defines the groove, and the conductive fixing piece 48 comprises the protrusion matched with the groove.

In some embodiments, the electric component 44 comprises a vibrator. The vibrator is electrically connected to the second conductive piece 46. The vibrator is connected to the first housing 42. The vibrator is configured to vibrate and drive the first housing 42 to vibrate.

The electric component 44 comprises the vibrator. The vibrator is electrically connected to the first conductive piece 24 through the second conductive piece 46, so that the first conductive piece 24 is allowed to supply power to the vibrator. The vibrator is configured to vibrate and drive the first housing 42 to vibrate, so that the rotating mechanism 40 is cable to rotate and vibrate.

In some embodiments, the vibrator is electrically connected to the first conductive piece 24 through the conductive circuit board 462 and the conductive pins 464 of the second conductive piece 46, so that the first conductive piece 24 is allowed to supply the power to the vibrator.

In some embodiments, the first housing 42 comprises a first portion 426 close to the driving mechanism 20 and a second portion 728 away from the driving mechanism 20. The vibrator is disposed in the second portion 428, so that a space in the first housing 42 is well utilized, and the vibrator and the second conductive piece 46 are reasonably disposed. In addition, the vibrator is disposed in the second portion 428 away from the driving mechanism 20, so a vibration amplitude is large.

In some embodiments, the electric component 44 comprises a heater. The heater is electrically connected to the second conductive piece 46. The heater is connected to the first housing 42. The heater is configured to generate heat and conduct the heat to the first housing 42.

The electric component 44 comprises the heater. The heater is electrically connected to the first conductive piece 24 through the second conductive piece 46, so as to be powered. The heater is configured to generate the heat and conduct the heat to the first housing 42, thereby increasing a temperature of the first housing 42, so that the rotating mechanism 40 is able to rotate while realizing a heating effect.

The electric component 44 comprises both of the vibrator and the heater.

In some other embodiments, the electric component 44 may comprise other apparatus as needed, such as a detection device, a light-emitting device, etc. The detection device may be a sensor as needed.

In some embodiments, the first conductive piece 24 comprises a conductive sheet 242. The conductive sheet 242 is sleeved on the rotating shaft 23 and is fixedly connected to the driving piece 22. The conductive sheet 242 abuts against the second conductive piece 46 and is electrically connected to the second conductive piece 46. The conductive sheet 242 is allowed to be sleeved on the rotating shaft 23 and the conductive sheet 242 is able to abut against and electrically connect to the second conductive piece 46.

In some embodiments, the conductive sheet 242 abuts against the conductive pins 464 and is electrically connected to the conductive pins 464. The conductive sheet 242 defines the conductive regions 2422 on one side facing the conductive pins 2422. Each of the conductive regions 2422 is disposed around the rotating shaft 23. The conductive regions 2422 are similarly in the concentric circle structure. Different conductive regions 2422 are electrically connected to different conductive pins 464 to realize a conductive function. In some embodiments, the conductive regions 2422 not only realizes the conductive function, but also a control function, such as controlling a switch of the electric component 44, transmitting the status and information of the electric component 44, etc.

In some embodiments, the conductive sheet 242 is an insulating carrier sleeved on the rotating shaft 23. Conductive metal rings are disposed on the one side, facing the conductive pins 464, of the insulating carrier. The conductive metal rings have different sizes, so that the conductive metal rings are sleeved on the rotating shaft 23 and are insulated from each other. The conductive metal rings are one-to-one corresponding to the conductive pins 464.

In some embodiments, the first conductive piece 24 further comprises a conductive fixing base 244. The conductive fixing base 244 is sleeved on the rotating shaft 23 and is fixedly connected to the driving piece 22. The conductive sheet 242 is fixedly connected to one side of the conductive fixing base 244 away from the driving piece 22. The first conductive piece 24 is mounted through the conductive fixing base 244, so the conductive sheet 242 is conveniently and stably mounted.

In some embodiments, the conductive sheet 242 comprises the conductive metal rings, and the conductive metal rings are directly disposed on the conductive fixing base 244. The sizes of the plurality of conductive metal rings are different, so that the conductive metal rings are sleeved on the rotating shaft 23 and are insulated from each other. The conductive metal rings are one-to-one corresponding to the conductive pins 464. The conductive metal rings are one-to-one corresponding to the conductive regions.

In some other embodiments, the first conductive piece 24 do not comprise the conductive fixing base 244, and the conductive sheet 242 is directly fixed on the driving piece 22.

In some embodiments, the conductive sheet 242 defines the conductive regions 2422. Each of the conductive regions 2422 is annular, each of the conductive regions 2422 is disposed around the rotating shaft 23, and the conductive regions are insulated from each other. The second conductive piece 46 comprises the conductive pins 464. Distance between the conductive pins 464 and the axis of the rotating shaft 23 are different. Each of the conductive pins 464 is electrically connected to the corresponding one of the conductive regions 2422.

In some embodiments, the first housing 42 comprises a first hard shell 422 and a first soft shell 424. The first hard shell 422 is disposed in the first soft shell 424. The electric component 44 and the second conductive piece 46 are mounted in the first hard shell 422.

The first soft shell 424 is sleeved on an outer side of the first hard shell 422, which well contacts with a human body and also waterproofs the rotating mechanism 40. The first soft shell 424 is made from soft materials such as silicone and plastic.

In some embodiments, the first hard shell 422 comprises two first sub-shells, and the two first sub-shells are connected together to form the first hard shell 422, so that the electric component 44 and the second conductive piece 46 are easily mounted in the first hard shell 422.

In some embodiments, a concave-convex structure or a convex spiral structure is disposed on an outer surface of the first soft shell 424. The concave-convex structure or the convex spiral structure enhances a massage effect of the rotary massage device 10. In some embodiments, the rotating mechanism is placed in the human body and massage the human body. That is, the first soft shell 424 is placed in the human body, and the first soft shell 424 directly contacts tissue in the human body and massages the human body.

In some embodiments, the driving mechanism 20 comprises a second housing 21. The driving piece 22 is disposed in the second housing 21. A gap is defined between the second housing 21 and the first housing 42, so a rotation of the first housing 42 is not affected. The first housing 42 and the second housing 21 are close to each other, making a structure of the rotary massage device 10 compact and simple. The driving piece 22 is a power source of the driving mechanism, and the driving piece 22 may be a direct-current (DC) motor, a stepping motor, or a servo motor.

In some embodiments, the second housing 21 comprises a second hard shell 212 and a second soft shell 214. The second hard shell 212 is at least partially disposed in the second soft shell 214. The driving piece 22 is disposed in the second hard shell 212.

The second soft shell 214 is sleeved on an outer side of the second hard shell 212, which well contacts with the human body, such being held by a user. The second soft shell 214 further waterproofs the rotating mechanism 40. The second soft shell 214 is made from soft materials such as silicone, plastic, etc.

In some embodiments, the second hard shell 212 comprises two second sub-shells 2122. The two second sub-shells 2122 are connected together to form the second hard shell 212, so that the driving piece 22 and the first conductive piece 24 are easily mounted in the second hard shell 212.

In some embodiments, the second hard shell 212 further comprises a back cover 2124 and a sheet cover 2126. The back cover 2124 is disposed on one side of the second sub-shell away from the first housing. A button groove is defined on an outer side of the second soft shell 214 corresponding to control buttons 27. The sheet cover 2126 is disposed in the button groove. The sheet cover 2126 comprises openings corresponding to the control buttons 27 to expose the control buttons 27 for the users to press the control buttons 27.

In some embodiments, the driving mechanism 20 further comprises a battery 25 and a control circuit board 26. The battery 25 and the control circuit board 26 are disposed in the second housing 21. The battery 25 is disposed on one side of the driving piece 22 away from the rotating mechanism 40. The battery 25 is electrically connected to the control circuit board 26, and the control circuit board 26 is electrically connected to the first conductive piece 24.

The battery 25, the control circuit board, etc. are mounted in the second housing 21 and are electrically connected to the first conductive piece 24, so that the electric component 44 in the second housing 21 is powered through the first conductive piece 24 and the second conductive piece 46, and the electric component 44 is allowed to be controlled as needed. The battery 25 and the driving piece 22 are disposed along the axis of the rotating shaft 23, the arrangement is more reasonable and compact, which makes a shape of the second housing 21 being suitable for the user to hold and use.

In some embodiments, the control circuit board 26 and the battery 25 are disposed along a width direction of the rotary massage device 10. The control circuit board 26 is at least partially disposed opposite to the battery 25.

The battery 25 is relatively large in size, and the control circuit board is a plate-shaped structure. The control circuit board and the battery 25 are at least partially disposed opposite to each other, so as to reasonably utilize a space in the second housing 21.

In some embodiments, the control circuit board 26 is partially disposed opposite to the driving piece 22. Even if a size of the control circuit board is relatively long, the control circuit board is able to be disposed on one side of the second housing opposite to the driving piece 22 and the battery 25, so that the space in the second housing 21 is reasonably utilized, which is conducive to a miniaturization of the second housing 21.

In some embodiments, the driving mechanism 20 further comprises the control buttons 27. The control buttons 27 are at least partially exposed outside the second housing 21. The control buttons 27 are electrically connected to the control circuit board 26. The control buttons are configured to control the rotary massage device 10, such as turning on and turning off the rotary massage device 10, rotating of the rotary massage device 10, vibrating of the rotary massage device 10, and heating function of the rotary massage device 10.

In some embodiments, the driving mechanism 20 further comprises a charging interface 28. The charging interface 28 is at least partially exposed outside the second housing 21. The charging interface 28 is electrically connected to the control circuit board 26. The charging interface 28 and the control buttons 27 are disposed on two opposite sides of the second housing 21, which is convenient for setting of the charging interface 28 and the control buttons 27. Therefore, the charging interface 28 and the control buttons 27 are not likely to interfere with each other. The charging interface 28 is disposed on a first side of the second housing 21 and is opposite to the control buttons, so the charging interface 28 is not affected by the control buttons 27. A position of the charging interface is determined as needed. The control key 27 is disposed on a second side of the second housing 21, and sizes of the control buttons 27 are configured as needed to facilitate user operation.

The embodiments of the present disclosure are illustrated in detail as above. In the present disclosure, specific embodiments are applied to illustrate the principles and implementations of the present disclosure. The above description of the embodiments is only used to better understand methods and core ideas of the present disclosure. Meanwhile, according to the ideas of the present disclosure, changes are made in the specific implementations and the application scope by those skilled in the art. Therefore, the contents of the specification should not be regarded as a limitation of the present disclosure.

What is claimed is:

1. A rotary massage device, comprising:
a driving mechanism; and
a rotating mechanism;
wherein the driving mechanism comprises a driving piece, a rotating shaft, and a first conductive piece, the driving piece is connected to the rotating shaft to drive the rotating shaft to rotate, and the first conductive piece is sleeved on the rotating shaft;
wherein the rotating mechanism comprises a first housing, an electric component, and a second conductive piece, wherein the first housing is connected to the rotating shaft, the electric component is mounted on the first housing, the electric component is electrically connected to the second conductive piece, the second conductive piece is sleeved on the rotating shaft, and the second conductive piece abuts against the first conductive piece and is electrically connected to the first conductive piece;
wherein the second conductive piece comprises a conductive circuit board and conductive pins, the conductive circuit board is sleeved on the rotating shaft, the conductive pins are connected to one side of the conductive circuit board facing the first conductive piece, each of the conductive pins is elastically abutted against and electrically connected to the first conductive piece, and the conductive circuit board is electrically connected to the electric component.

2. The rotary massage device according to claim 1, wherein the rotating mechanism further comprises a conductive fixing piece, the conductive fixing piece is fixedly connected to the first housing, the conductive circuit board is mounted on the conductive fixing piece, and the conductive fixing piece is connected to the rotating shaft and rotates along with the rotating shaft.

3. The rotary massage device according to claim 2, wherein the first conductive piece defines conductive regions, each of the conductive regions is disposed around the rotating shaft, and the conductive regions are insulated from each other;
distance between the conductive pins and an axis of the rotating shaft are different, and each of the conductive pins are electrically connected to a corresponding one of the conductive regions.

4. The rotary massage device according to claim 2, wherein the conductive fixing piece comprises a mounting hole, the rotating shaft comprises an end portion plugged into the mounting hole, the end portion has a cutting surface, and a shape of the mounting hole is matched with the end portion of the rotating shaft, so that the conductive fixing piece rotates along with the end portion of the rotating shaft.

5. The rotary massage device according to claim 1, wherein the electric component comprises a vibrator, the vibrator is electrically connected to the second conductive piece, the vibrator is connected to the first housing, and the vibrator is configured to vibrate and drive the first housing to vibrate.

6. The rotary massage device according to claim 5, wherein the first housing comprises a first portion and a second portion, the first portion is closer to the driving mechanism than the second portion, and the vibrator is disposed on the second portion.

7. The rotary massage device according to claim 1, wherein the electric component comprises a heater, the heater is electrically connected to the second conductive piece, the heater is connected to the first housing, and the heater is configured to generate heat and conduct the heat to the first housing.

8. The rotary massage device according to claim 1, wherein the first conductive piece comprises a conductive sheet, the conductive sheet is sleeved on the rotating shaft and is fixedly connected to the driving piece, and the conductive sheet abuts against the second conductive piece and is electrically connected to the second conductive piece.

9. The rotary massage device according to claim 8, wherein the first conductive piece further comprises a conductive fixing base, the conductive fixing base is sleeved on the rotating shaft and is fixedly connected to the driving piece, and the conductive sheet is fixedly connected to one side of the conductive fixing base away from the driving piece.

10. The rotary massage device according to claim 8, wherein the conductive sheet defines conductive regions, each of the conductive regions is annular, each of the conductive regions is disposed around the rotating shaft, and the conductive regions are insulated from each other;

wherein the second conductive piece comprises conductive pins, distance between the conductive pins and an axis of the rotating shaft are different, and each of the conductive pins is electrically connected to a corresponding one of the conductive regions.

11. The rotary massage device according to claim 1, wherein the first housing comprises a first hard shell and a first soft shell, the first hard shell is disposed in the first soft shell, and the electric component and the second conductive piece are mounted in the first hard shell.

12. The rotary massage device according to claim 11, wherein a concave-convex structure or a convex spiral structure is disposed on an outer surface of the first soft shell.

13. The rotary massage device according to claim 1, wherein the driving mechanism comprises a second housing, the driving piece is disposed in the second housing, and a gap is defined between the second housing and the first housing.

14. The rotary massage device according to claim 13, wherein the second housing comprises a second hard shell and a second soft shell, the second hard shell is at least partially disposed in the second soft shell, and the driving piece is disposed in the second hard shell.

15. The rotary massage device according to claim 13, wherein the driving mechanism further comprises a battery and a control circuit board, the battery and the control circuit board are disposed in the second housing, the battery is disposed on one side of the driving piece, the battery is electrically connected to the control circuit board, and the control circuit board is electrically connected to the first conductive piece.

16. The rotary massage device according to claim 15, wherein the control circuit board and the battery are disposed along a width direction of the rotary massage device, and the control circuit board is at least partially disposed opposite to the battery.

17. The rotary massage device according to claim 16, wherein the control circuit board is partially disposed opposite to the driving piece.

18. The rotary massage device according to claim 15, wherein the driving mechanism further comprises at least one control button, the at least one control button is at least partially exposed outside the second housing, and the at least one control button is electrically connected to the control circuit board.

19. The rotary massage device according to claim 18, wherein the driving mechanism further comprises a charging interface, the charging interface is at least partially exposed outside the second housing, the charging interface is electrically connected to the control circuit board, and the charging interface and the at least one control button are disposed on two opposite sides of the second housing.

20. A rotary massage device, comprising:

a driving mechanism; and a rotating mechanism;

wherein the driving mechanism comprises a driving piece, a rotating shaft, and a first conductive piece, the driving piece is connected to the rotating shaft to drive the rotating shaft to rotate, and the first conductive piece is sleeved on the rotating shaft;

wherein the rotating mechanism comprises a first housing, an electric component, and a second conductive piece, wherein the first housing is connected to the rotating shaft, the electric component is mounted on the first housing, the electric component is electrically connected to the second conductive piece, the second conductive piece is sleeved on the rotating shaft, and the second conductive piece abuts against the first conductive piece and is electrically connected to the first conductive piece;

wherein the first conductive piece comprises a conductive sheet, the conductive sheet is sleeved on the rotating shaft and is fixedly connected to the driving piece, and the conductive sheet abuts against the second conductive piece and is electrically connected to the second conductive piece.

* * * * *